United States Patent [19]

Hospied

[11] E Re. 29,988

[45] Reissued May 8, 1979

[54] PROCESS AND DEVICE FOR MAKING FABRICS WITH NON-WOVEN PILE

[75] Inventor: Jean J. Hospied, Dottignies, Belgium

[73] Assignee: A. F. Stoddard & Co., Ltd., Johnstone, Scotland

[21] Appl. No.: 355,695

[22] Filed: Apr. 30, 1973

Related U.S. Patent Documents

Reissue of:

[64] Patent No.: 3,691,069
Issued: Sep. 13, 1972
Appl. No.: 135,262
Filed: May 19, 1971

U.S. Applications:

[63] Continuation of Ser. No. 584,249, Oct. 4, 1966, abandoned.

[30] Foreign Application Priority Data

Oct. 11, 1965 [BE] Belgium ..... 670784

[51] Int. Cl.[2] ..... D04H 11/04

[52] U.S. Cl. ..... 156/72; 156/435

[58] Field of Search ..... 156/72, 435, 436, 474

[56] References Cited

U.S. PATENT DOCUMENTS

| | | | |
|---|---|---|---|
| 2,101,906 | 12/1937 | Hopkinson | 156/435 |
| 3,010,508 | 11/1961 | Wilson | 156/459 |
| 3,127,293 | 3/1964 | Trenteseaux | 156/72 |

FOREIGN PATENT DOCUMENTS

| | | |
|---|---|---|
| 112680 | 11/1937 | Japan. |
| 821196 | 9/1959 | United Kingdom. |
| 891362 | 3/1968 | United Kingdom. |

*Primary Examiner*—Michael W. Ball

[57] ABSTRACT

A process for making fabrics with non-woven pile where a continuous thread or band is fed to a parallel passage having two parallel support bands each carrying a layer of adhesive. The thread or fabric is prefolded with a flexible bladelet and then driven with a substantially circular movement by folder blades against the support band. After having produced the desired adhesive connection of the fabric and the band, the adhesive is cured and the support bands are separated to produce the finished product.

5 Claims, 2 Drawing Figures

PROCESS AND DEVICE FOR MAKING FABRICS WITH NON-WOVEN PILE

Matter enclosed in heavy brackets [ ] appears in the original patent but forms no part of this reissue specification; matter printed in italics indicates the additions made by reissue.

This application is a continuation of Ser. No. 584,249 filed Oct. 4, 1966 and now abandoned.

*CROSS REFERENCE TO RELATED APPLICATION*

*This is a reissue application of U.S. Pat. No. 3,691,069 and is related to pending application Ser. No. 220,454, filed Jan. 24, 1972, which is a continuation of Ser. No. 871,286 filed Nov. 13, 1969, now abandoned, which is a divisional application of Ser. No. 584,249 filed Oct. 4, 1966, now abandoned.*

The present invention relates to a process for manufacturing fabrics with nonwoven pile such as carpets or velvets, according to which one coats, on one side only, two continuous support bands with a layer of adhesive; one displaces these support bands in a passage in which they lie practically parallel to one another at a predetermined distance from one another in such a way that the adhesive layer carried by one of the support bands faces that carried by the other support band; one drives at least one continuous element in the form of a thread or band by folder blades, alternately against the adhesive layers carried by the support bands when they are displaced at the entrance to the above-mentioned passage or in the neighbourhood thereof, in such a way as to apply the continuous element alternately against these adhesive layers and to fold it zigzag; one ensures the hold by at least one of the adhesive layers and one then separates the support bands from one another.

According to the known processes of this kind, one drives the continuous element alternately against the adhesive layers carried by the support bands without considering the line of impact of the folder blades against this continuous element. Generally, one displaces each folder blade in such a way that the latter comes into contact with the continuous element in the neighbourhood of the edge of the entrance of the above-mentioned passage situated on the side of this blade. Thereby it results that the blade in question slides on the lateral face of the continuous element before applying the loop of the new fold against the adhesive layer corresponding thereto. Such a sliding of the blades alternately against the lateral faces of the continuous element presents disadvantages.

By the sliding friction, the blade may deteriorate the continuous element. Besides, this sliding produces irregular loops in the folds formed. Moreover, as a result of such sliding, the blade produces a traction on the fold which has just been formed. This traction, which is at first oblique to the adhesive layer to which the fold is stuck and which becomes perpendicular to this layer, tends to pull at this last fold and to be unfavourable to the sticking thereof.

The invention has as object an improvement to the above-mentioned process due to the elimination of these disadvantages.

To this end, after having formed a fold by the driving of the continuous element by one of the folder blades against the adhesive layer of one of the bands, one drives, according to the new process, the continuous element by the other folder blade against the adhesive layer of the other band by applying this order blade against this element, at a point thereon fairly distant from the fold which has just been formed, at a length equal to the distance apart of the adhesive layers or of the support bands situated in the above-mentioned passage, the distance between the above-mentioned point and the previously mentioned fold being measured along the said element and in the longitudinal direction thereof.

The invention also has as object a device for the manufacture of fabrics with nonwoven pile allowing of carrying out the new process.

With respect to the known devices, the device according to the invention differs in that the folder blades of the above-mentioned folding mechanism are each positioned at the end of an oscillating connecting-rod articulated with two suspension cranks pivoting respectively about pivots with a fixed axis, of which one is controlled by an appropriate control device, the centre-to-centre distance between the articulation pivots of the rod on the one hand, and of the two cranks on the other hand, being regulable as well as at least that between one of these pivots and the rotation pivots of the corresponding crank.

According to a particularity of the new device further favouring the regulation of the trajectory of each folder blade to ensure the favourable impact of the latter against the continuous element, the said folder blade has, on the supporting connecting-rod, a regulable position with respect to the axes of the articulation pivots of this rod with the two cranks.

According to another interesting particularity of this new device, the centre-to-centre distance between the articulation pivot and the connecting-rod to at least one of the cranks and that of rotation of the corresponding crank is regulable.

The invention will now be described with reference to the accompanying drawings which show an embodiment of the invention but in no restrictive sense.

In these two figures the same reference numbers indicate identical elements.

Figure 1:
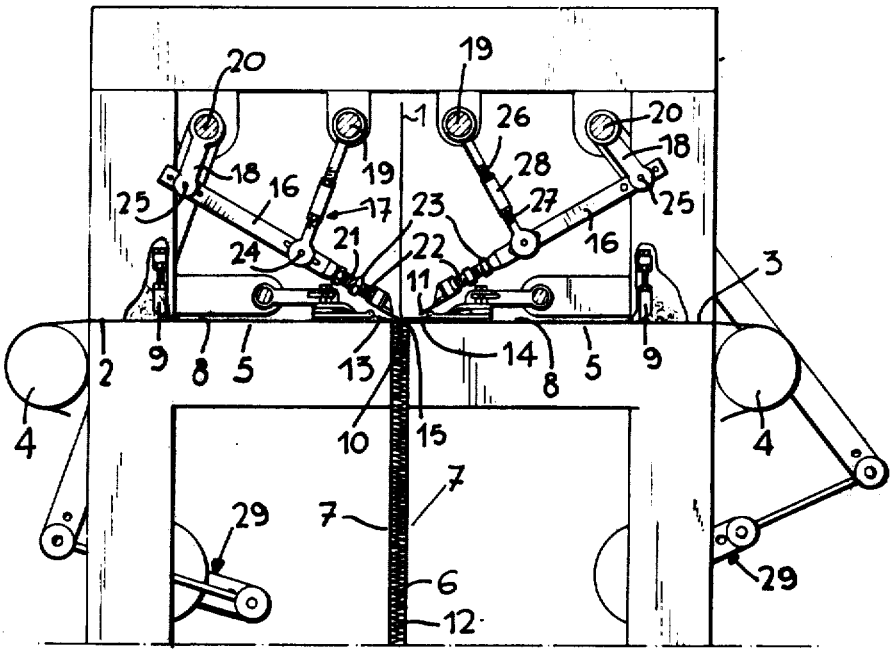
FIG. 1 is a view in elevation of a form of embodiment of a new device.

The device represented serves to manufacture at least one fabric with nonwoven pile and in particular a carpet. The manufacture of this carpet employs essentially, on the one hand a continuous element 1 in the form of a succession of threads or of a band and on the other hand two support bands 2 and 3. In a general way, the continuous element 1 is folded zigzag between the two support bands 2 and 3, is fixed to these bands and is then cut as necessary, in such a way as to obtain one or two finished pieces, cut or looped. More especially each continuous band is wound over the roller 4 and is guided along horizontal guides 5 situated in one plane towards the vertical passage 6 delimited by vertical guides 7 separated from one another by a predetermined distance.

In the course of their horizontal travel above the guides 5, the support bands 2 and 3 are each covered on their upper face with an adhesive layer 8 provided by an adhesive distributor consisting, for example, of a spreading-edge 9 positioned above the corresponding band and determining therewith an orifice for the passage of a certain quantity of adhesive proceeding from a supply thereof positioned above the spreading-edge.

In the above-mentioned vertical passage 6 the support bands are displaced practically parallel to one another with their adhesive layers situated facing one another.

The device includes, besides, an alternating folding mechanism for the continuous element 1 at the entrance of the passage 6. This mechanism comprises essentially two folder blades 10 and 11 which drive alternately the continuous element 1 respectively towards and against the adhesive layer 8 carried by the support band 3 and against that carried by the support band 2, in such a way as to form zigzag folds 12 which adhere, by their loop, to the adhesive layers 8 and which are thus entrained simultaneously, towards the base and at the same speed by the support bands 2 and 3. The device allows, after formation of these folds, of fixing one and/or the other of the adhesive layers 8 by means not shown, such as heating boxes for these layers, and, after this fixing, of cutting the folds fixed to the bands 2 and 3 by the intermediary of the hardened adhesive layers by cutting means likewise not shown, such as for example a cutting blade positioned in the median plane of the passage 6 at the end of this last.

The folding mechanism also advantageously includes pre-folding flexible bladelets 13 and 14 which are controlled respectively by the folder blades 10 and 11. Each bladelet 13 or 14 is moved by the corresponding blade 10 or 11 when the latter drives the continuous element on the opposite side, in such a way that its free end is brought down to the entrance of the passage 6. The role of these bladelets 13 and 14 is to deflect the continuous element from the opposite side when these bladelets are not brought down by their corresponding blades and thus when the continuous element is driven below them, on their side, by the other blade.

According to the inventive idea, each folder blade enters into contact with the continuous element 1 at a point thereon represented by the line indicated by the number 15. Moreover, this blade remains in contact with this element 1 practically at this point 15 during the driving of the said element 1 by this blade against the corresponding adhesive layer. The point 15 in question is chosen so that its distance to the fold which has just been formed, measured along the element 1, is practically equal to the width separating the support bands 2 and 3 in the vertical passage 6.

Figure 2:
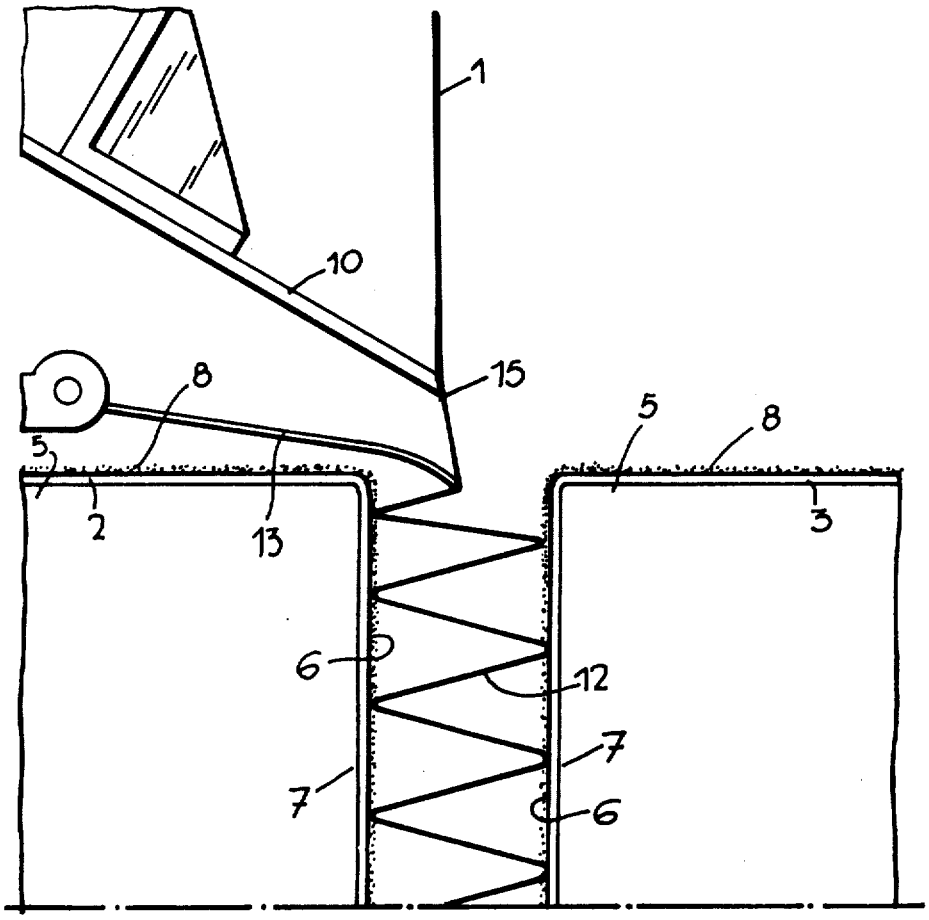
FIG. 2 shows, on a larger scale, the impact of one of the folder blades against the continuous element and thus illustrates the new process.

As can be seen in FIG. 2, the specific point 15 of the element 1, where the pressure of the folder blade is applied, practically describes a circular arc about the the end of the bladelet situated below this blade and then a short arc of a circle about the loop of the fold which has just been formed.

So that its end can accomplish the quasi-circular trajectory during the driving of the element 1, each folder blade 10 or 11 is mounted on an oscillating connecting-rod 16 which is suspended from two cranks 17 and 18 pivoting respectively about two pivots 19 and 20, of which 20 is controlled alternately by a conventional oscillating crank-rod mechanism 29. The connecting-rod 16 has a regulable length due to a system of two threaded rods 21 and 22 with inverse pitch linked by a nut 23 presenting two screwings corresponding to the threads of these rods, this system being placed between the folder blade and the articulation point of the connecting rod 16 of the crank 17. On the other hand, the centre-to-centre distance between the articulation pivots 24 and 25 of the connecting-rod 16 to the cranks 17 and 18 can be regulated in length and to this end the pivots in question may be engaged in several holes or in an elongated slot lying longitudinally with respect to the connecting-rod 16.

Moreover, at least one of the two cranks, and in the case shown the crank 17, is likewise regulable in length due to threaded rods 26 and 27 with inverse pitch, linked together by a nut 28 presenting two screwings corresponding to the threadings of these rods. In the same way, the centre-to-centre distance between the pivots 19 and 24 is likewise regulable. It is due to this double regulation of the centre-to-centre distances of the pivots 24 and 25 on the one hand and 19 and 24 on the other hand and perhaps also to the possibility of lengthening or shortening the course of the connecting-rod 16 and the length thereof from the side of the continuous element 1 that one can transmit to the edge of the folder blade entering into contact with this continuous element a judiciously conceived trajectory depending on the point of retention of the said element by the bladelet to avoid all sliding of the edge of this blade against this continuous element and prevent thus all traction on the fold which has just been formed.

It is clear that the invention is not exclusively limited to the form of performance shown and indeed that modifications may be applied to the form, the arrangement and the constitution of certain of the elements involved in its embodiment, with the condition that these modifications are not inconsistent with the object of each of the following claims.

That which is claimed is:

1. A process for manufacturing fabrics with nonwoven pile such as carpets and velvet comprising coating on one side only two continuous support bands with a layer of adhesive; displacing these support bands in a passage in which they lie substantially parallel to one another at a predetermined distance from one another so that the adhesive layer carried by one of the support bands faces the layer carried by the other support band; feeding at least one continuous element to the passage; alternately prefolding the continuous element with a flexible bladelet to displace the continuous element adjacent the adhesive support band; alternately driving the pre-folded continuous element by folder blades against the adhesive layers carried by the support bands when the latter are displaced at the entrance to the passage in such a manner as to apply the continuous element alternately against these adhesive layers and to fold it zigzag, each folder blade being in contact with the continuous element during said driving, at a point fairly distant from the fold which has just been formed, and at a distance approximately equal to the separation of the adhesive layers situated in the passage, the distance between the contact point and the previous fold being measured along the element and in the longitudinal direction thereof, ensuring the hold of at least one of the adhesive layers and separating the support bands from one another.

2. A process as claimed in claim 1, comprising at the moment of applying a folder blade against the continuous element to drive the latter against the corresponding band, transmitting to the edge of this blade in contact with this element a substantially circular movement about the edge of the pre-folder bladelet controlled by the blade, until this edge reaches the band.

3. A process for manufacturing non-woven pile fabrics such as carpets and velvet comprising the steps of coating a face of each of two support sheets with a layer of adhesive; moving the support sheets in spaced relation with their adhesive layers opposed; feeding at least one continuous element into the space between said layers; deflecting the continuous element alternately toward the adjacent adhesive layers; driving the deflected element against the adhesive layer toward which it is deflected to attach the element alternately to the adhesive layers in folded configuration, said element being driven by pushing the element alternately on opposite sides thereof at a point along the element whose distance from the previous point of attachment of the element to the adhesive layer is approximately equal to the separation distance of the adhesive layers; ensuring the hold of the continuous element by at least one of the adhesive layers; and separating the layers from each other.

4. A process as defined in claim 3 wherein the continuous element is deflected by contact by a pair of opposed movable bladelets located on opposite sides of the continuous element, the deflected element is driven against the adhesive layers by alternately being contacted by moving folding blades positioned on opposite sides of the element, and wherein the continuous element is driven against the adhesive layers by transmitting to the edge of the folding blade in contact with the element a substantially curvilinear movement about the edge of the bladelet displacing the continuous element until the edge of the blade reaches the adhesive layer.

5. A process for manufacturing non-woven pile fabrics such as carpets and velvet comprising the steps of coating a face of each of two support sheets with a layer of adhesive; moving the support sheets in spaced relation with their adhesive layers opposed; feeding at least one continuous element into the space between said layers; driving the element alternately toward the adjacent adhesive layers to attach the element alternately to the adhesive layers in folded configuration, said element being driven by pushing the element alternately on opposite sides thereof at a point along the element whose distance from the previous point of attachment of the element to the adhesive layer is approximately equal to the separation distance of the adhesive layers; ensuring the hold of the continuous element by at least one of the adhesive layers; and separating the layers from each other.

* * * * *